June 10, 1924.
O. MOOG
ELECTRICAL TRANSPORT CAR
Filed May 26, 1923
1,497,529
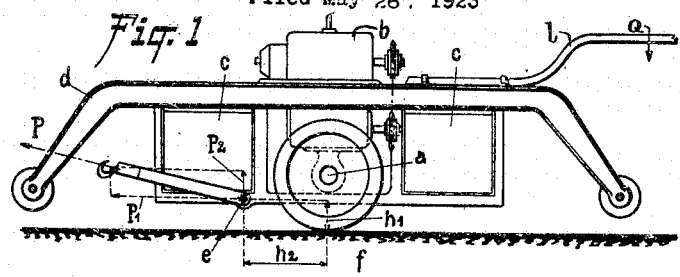
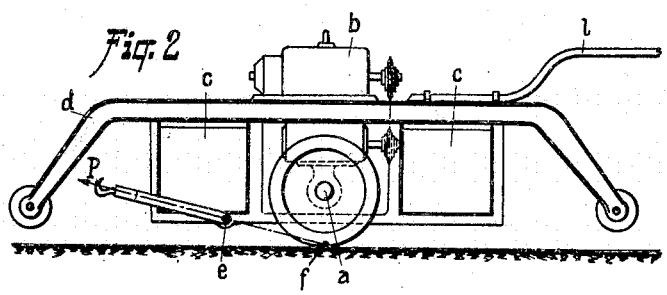
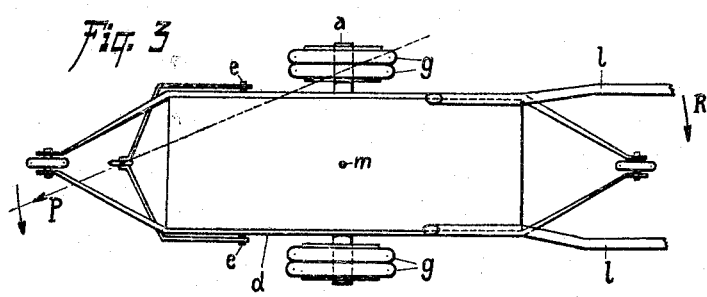
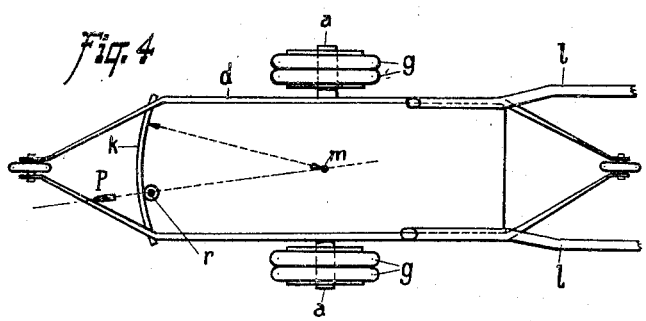
Inventor
Otto Moog
by C. Arndt & Dr.-Ing. Bock.
Per ⟨signature⟩ Attorney Patented June 10, 1924.

1,497,529

UNITED STATES PATENT OFFICE.

OTTO MOOG, OF BRUNSWICK, GERMANY.

ELECTRICAL TRANSPORT CAR.

Application filed May 26, 1923. Serial No. 641,796.

*To all whom it may concern:*

Be it known that I, Dr.-Ing. OTTO MOOG, a citizen of Germany, residing at Brunswick, Germany, have invented certain new and useful Improvements in Electrical Transport Cars (for which I have filed applications in Germany, May 24, 1922, and December 18, 1922; Italy, May 1, 1923), of which the following is a specification.

My invention relates to electrical transport cars having two wheels which are adapted to be guided by means of a shaft or a till, and the mass of which is distributed in such a manner that the centre of gravity is situated over the axis of the wheels so that it is not necessary for the operator to exert lifting force. According to the invention distribution of the mass is accomplished in a simple, practical manner in tractors which are adapted to draw other cars but which do not themselves serve to bear a load. In such cars the place over the axle is not occupied by a load or by a box for a load but is left free for mechanism or other parts of the car itself. Further it is preferable to have the centre of gravity situated as low as possible and to distribute the mass symmetrically on both sides of the axis.

Fig. 1 is a side elevation of a tractor embodying my invention and showing diagrammatically the relations of the moments of force when said tractor is drawing another car.

Fig. 2 is a view similar to Fig. 1 showing the direction of action of the tractive force in the operation of the tractor.

Fig. 3 is a plan view of the tractor shown in Fig. 1, certain parts being omitted for the sake of clarity of illustration.

Fig. 4 is a view similar to Fig. 3 of a modified form of the invention.

For the above-mentioned purpose one or more electrical motors $b$ are so arranged over the wheel-axle $a$, that their centre of gravity lies vertically over the axle. The accumulators $c$, the heavy weight of which requires a low position, are suspended beneath the frame $d$ with their weight equally distributed on both sides of the axle so that the moments of forces tending to tip over the car are counter balanced.

In tractors of the usual type the operator operating through the shaft $l$, must overcome the moment of forces, produced by the resistance at P of the drawn car. By the present invention this moment is overcome or materially diminished. For this purpose the point $e$, to which the rearwardly and upwardly extending traction member connecting the tractor to the drawn car is jointed, is arranged below and behind the wheel-axis (see Fig. 1). In this manner the moment $P_2 h_2$ of the power P acts in the opposite direction to the moment $P_1 h_1$.

The result of these two moments becomes zero, if the direction of the tractive power passes through the connecting line of the supporting points of the two wheels, as may be seen in Fig. 2.

But difficulties may be caused by still another moment if the tractive power is in a direction which is at an angle to the longitudinal axis of the truck, that is to say, where the tractive power does not pass through the points $m$ equidistant between the two wheels. This moment must be compensated by a horizontal force R produced by the operator. According to the invention this moment is compensated for by providing that the point at which the weight of the drawn car bears upon the tractor is movable on the arc of a circle having its centre at the point $m$ midway between the two wheels. The tracting member (e. g., a chain) is provided with a roller $r$, which runs on an arc $k$ and which assumes such a position that the line of pull passes in all cases through the point $m$.

For facilitating the passage of the truck over uneven ground as well as, over rails, grooves and other obstacles often to encountered in manufacturing plants, places of shipment, goods-stations and the like, the wheels are each provided with two or more rubber tyres $g$ (Figs. 3 and 4) arranged side by side. Small and low double tyres are preferable for this purpose.

Having now described my invention what I claim is:

1. An electric tractor, comprising an axle, a pair of wheels mounted on said axle, an electric motor mounted above said axle, and electrical accumulators mounted on opposite sides of said axle with their weight so distributed as to balance the moments of forces tending to tip the tractor over.

2. An electric tractor, comprising an axle, a pair of wheels mounted on said axle, an electric motor mounted above said axle, electric accumulators mounted on opposite sides of said axle with their weight so distributed as to balance the moments of forces tending to tip the tractor over, and a traction member connected to said tractor at a point below and behind said axle and extending upwardly and rearwardly therefrom.

3. An electric tractor, comprising an axle, a pair of wheels mounted on said axle, an electric motor mounted above said axle, electric accumulators mounted on opposite sides of the axle with their weight so distributed as to balance the moments of forces tending to tip the tractor over, and a traction member connected to said tractor at a point below and behind said axle and extending upwardly and rearwardly from said point in a plane which projected forwardly from said point intersects a line drawn through the points at which said wheels bear upon the ground.

4. An electric tractor, comprising an axle, a pair of wheels mounted on said axle, an electric motor mounted above said axle, electric accumulators mounted on opposite sides of said axle and of which the weight is so distributed as to balance the moments of forces tending to tip the tractor over, a traction member connected to said tractor at a point below and behind said axle and extending upwardly and rearwardly from said point in a plane which, when extended forwardly from said point intersects a plane drawn through the axis of said axle and the points at which said wheels bear upon the ground.

5. An electric tractor, comprising an axle, a pair of wheels mounted on said axle, an electric motor mounted above said axle, electric accumulators mounted on opposite sides of said axle with their weight so distributed as to balance the moments of forces tending to tip the tractor over, a traction member connected to said tractor at a point below and behind said axle in a plane which projected forwardly of said point intersects a line drawn through the points of which said tires bear upon the ground, an arcuate member carried by said tractor at the rear of said axle and having as its center a point midway between said wheels, and a roller carried by said traction member and bearing upon said arcuate member.

In testimony whereof I have affixed my signature in presence of two witnesses.

Dr.-Ing. OTTO MOOG.

Witnesses:
Wilhelm Lehrke,
Willi Jahn.